United States Patent
Hwang (10) Patent No.: US 6,434,015 B1
(45) Date of Patent: Aug. 13, 2002

(54) SMALL FORM-FACTOR PLUGGABLE MODULE HAVING RELEASE DEVICE

(75) Inventor: Jeng-Yih Hwang, Irvine, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/999,446

(22) Filed: Dec. 3, 2001

(51) Int. Cl.[7] .................................................. H05K 5/00
(52) U.S. Cl. ..................... 361/754; 361/798; 361/801; 361/728; 70/208; 439/76.1; 439/160; 439/358; 439/357
(58) Field of Search ................ 361/754, 728, 361/798, 801; 70/208; 439/160, 357, 358, 76.1; 385/92

(56) References Cited

U.S. PATENT DOCUMENTS 6,157,542 A * 12/2000 Wu ............................ 361/736
6,178,096 B1 * 1/2001 Flickinger et al. .......... 206/719
6,276,943 B1 * 8/2001 Boutros et al. .............. 439/676
6,332,783 B1 * 12/2001 Ukiya et al. ................ 439/76.1

* cited by examiner

Primary Examiner—Jayprakash N. Gandhi
Assistant Examiner—Thanh S. Phan
(74) Attorney, Agent, or Firm—Wei Te Chung (57) ABSTRACT

An SFP module includes a housing (1) and an ejector (70). An ejector seat (111) is formed in the housing for receiving the ejector. A triangular latch (114) is formed on the housing behind the ejector seat. The ejector includes a push bar (79) exposed forward of a front end (17) of the housing, and a tongue board (74). Two ejecting protrusions (741) are formed at a rear end of the tongue board, corresponding to a spring tab (611) of an SFP cage (6). The spring tab defines a retaining hole (613) for retaining the latch of the housing. When the SFP module is withdrawn from the cage, the push bar is pressed until the protrusions of the ejector have released the spring tab from the latch of the housing. The SFP module is then ejected from the cage by conventional spring means located in a rear of the cage.

13 Claims, 11 Drawing Sheets

SMALL FORM-FACTOR PLUGGABLE MODULE HAVING RELEASE DEVICE

BACKGROUND OF THE INVENTION

1. Field of the Invention

The present invention relates to small form-factor pluggable (SFP) modules, and particularly to SFP modules having release devices which are used to withdraw the SFP modules from SFP cages.

2. Description of Related Art

Nowadays SFP transceivers are being more and more widely used for bi-directional transmission of data between an electrical interface and an optical data link. An SFP transceiver receives electrically encoded data signals, converts them into optical signals, and transmits the optical signals over the optical data link. The SFP transceiver also receives optically encoded data signals, converts them into electrical signals, and transmits the electrical signals onto the electrical interface.

The SFP transceiver is generally encased in an SFP cage. The cage has standardized features that comply with the SFP transceiver multi-source agreement (MSA). The cage conventionally comprises spring means located in a rear portion thereof. When the SFP transceiver is withdrawn from the cage, an ejecting block of the SFP transceiver forces a latch of the SFP transceiver out from a retaining hole defined in a retaining tab of the cage. The latch is released from the retaining tab. The SFP module is then ejected from the cage by the spring means. The MSA also specifies an exemplary release device for an SFP module. The SFP module defines a guide rail at a bottom of a front portion thereof. An ejecting block slidably engages in the guide rail at the bottom of the SFP module. In order to withdraw the SFP module from the cage, the ejecting block is manually pushed inwardly under the SFP module. However, it is inconvenient to manually push the ejecting block at that location. This is particularly so in modem systems having high port densities in and around the cage that restrict access to the ejecting block.

SUMMARY OF THE INVENTION

Accordingly, an object of the present invention is to provide an SFP module having a release device which is readily operated in front of the SFP module.

In order to achieve the object set above, an SFP module in accordance with a preferred embodiment of the present invention comprises a housing and an ejector. An ejector seat is formed at a front section of a lower portion of the housing, for receiving the ejector. Two retaining blocks are formed on the ejector seat, for preventing the ejector from falling out of the ejector seat. A triangular latch is integrally formed on a bottom surface of the lower portion of the housing, behind the ejector seat. The ejector includes a push bar, a main body, and a tongue board. Two slanted ejecting protrusions are formed at respective opposite sides of a rear end of the tongue board, corresponding to a bent portion of a spring tab of an SFP cage retaining the SFP module therein. The spring tab defines a retaining hole for retaining the latch of the housing. The push bar is exposed forward of a front end of the housing. To withdraw the SFP module from the cage, the push bar is pushed until the ejecting protrusions of the ejector have released the spring tab from the latch of the housing. The SFP module is then ejected from the cage by conventional spring means located in a rear portion of the cage.

Other objects, advantages and novel features of the invention will become more apparent from the following detailed description when taken in conjunction with the accompanying drawings, in which:

DETAILED DESCRIPTION OF PREFERRED EMBODIMENTS OF THE INVENTION

Reference will now be made to the drawings to describe the present invention in detail.

Figure 1A:
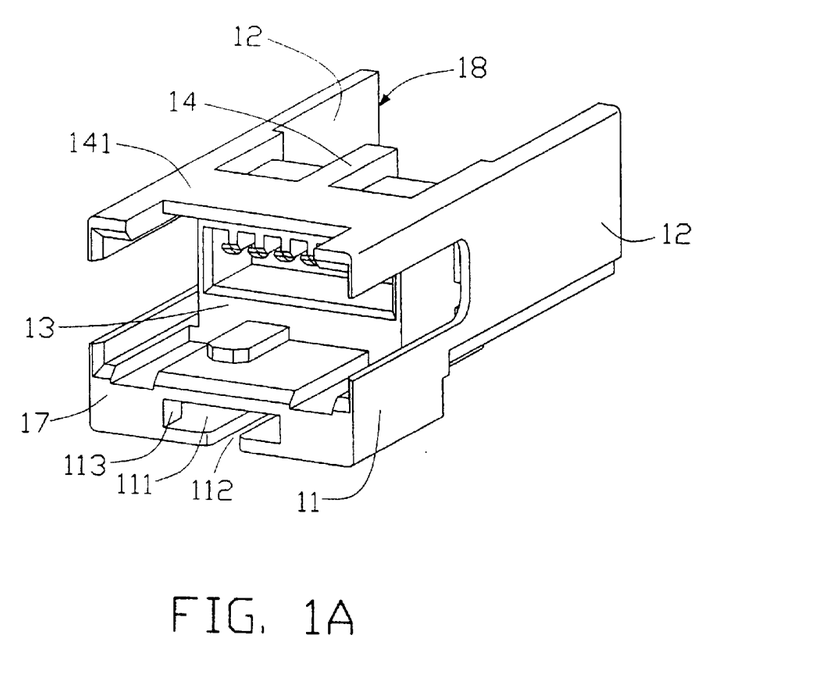
FIG 1A is a perspective view of part of a housing of an SFP module in accordance with a preferred embodiment of the present invention.
Figure 1B:
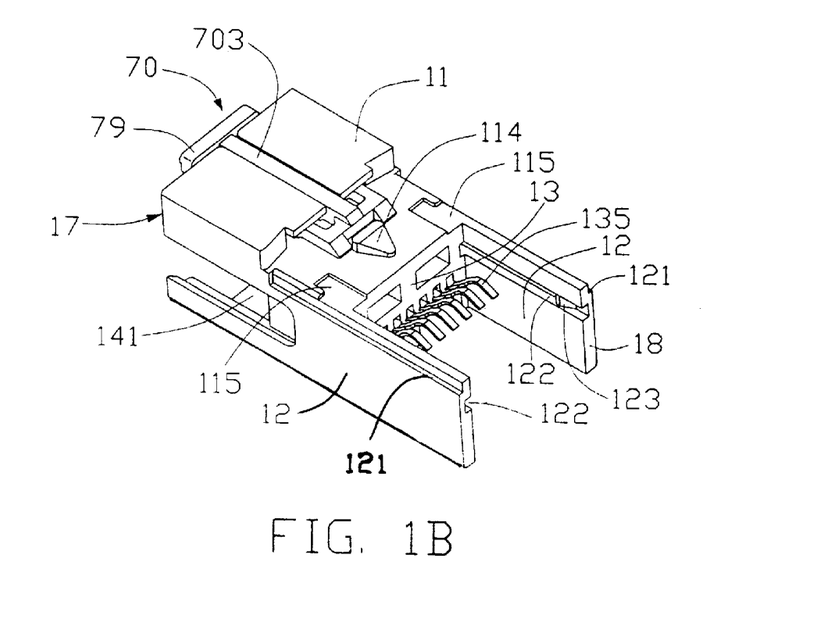
FIG. 1B is similar to FIG. 1A, but viewed from a bottom aspect and showing the entire housing.
Figure 5:
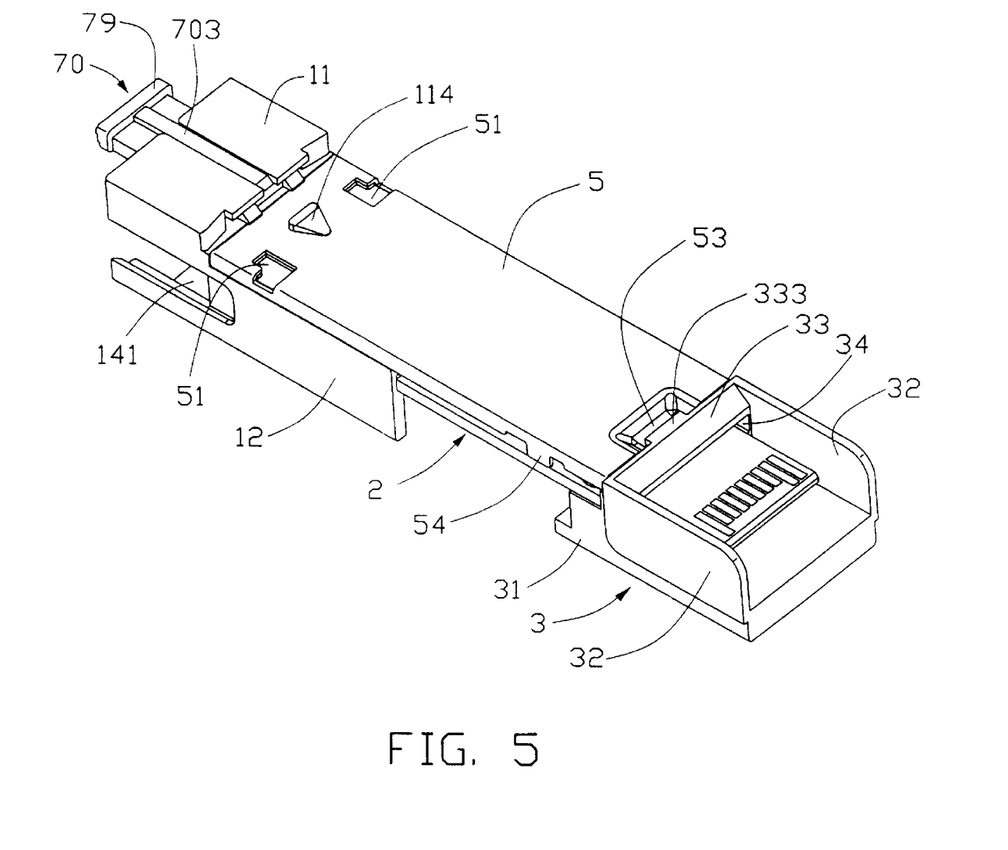
FIG. 5 is an assembled view of the housing, the PCB, the base and a lower cover of the SFP module in accordance with the preferred embodiment of the present invention, viewed from a bottom aspect.
Figure 6A:
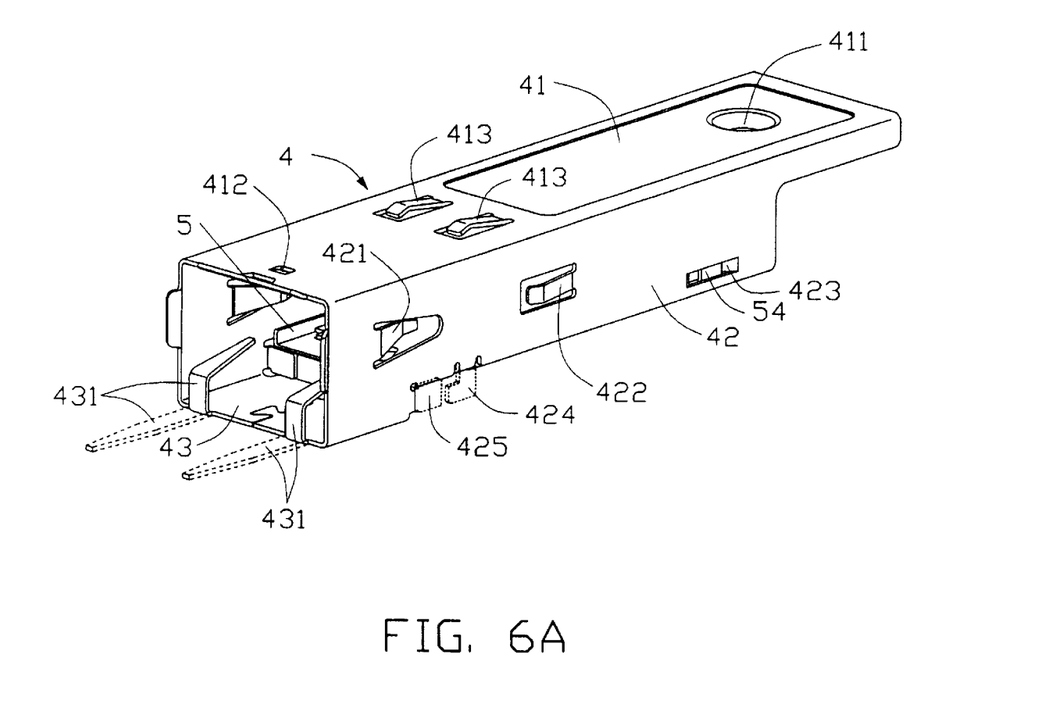
FIG. 6A is an assembled view of the lower cover and an upper cover of the SFP module in accordance with the preferred embodiment of the present invention.

As shown in FIGS. 1B, 5 and 6A, an SFP module in accordance with a preferred embodiment of the present invention comprises a housing 1, a printed circuit board (PCB) 2, a base 3, an upper cover 4 and a lower cover 5. The PCB 2 is retained by and between the housing 1 and the base 3. The upper and lower covers 4, 5 encase the housing 1, the PCB 2 and the base 3 therein.

Referring to FIGS. 1A and 1B, the housing 1 is generally made of plastic material. The housing 1 comprises a front end 17, a rear end 18, a lower portion 11, two parallel and opposite sidewalls 12 extending generally upwardly from the lower portion 11, a bracket 13, an upper portion 14, and an ejector 70. The bracket 13 is integrally enclosed by the lower portion 11, the sidewalls 12 and the upper portion 14. A front section of the lower portion 11 forms an ejector seat 111. A longitudinal guide slot 112 is defined in a front middle portion of the ejector seat 111. The ejector seat 111 and guide slot 112 cooperate to slidably receive the ejector 70. Two retaining blocks 113 are formed on the ejector seat 111 on opposite sides of the guide slot 112 respectively, for preventing the ejector 70 from falling out of the ejector seat 111. A triangular latch 114 is integrally formed on a bottom surface of the lower portion 11, behind the ejector seat 111. A bottom surface of the triangular latch 114 slants upwardly toward the bottom surface of the lower portion 11, from a front end of the triangular latch 114 to a rear end of the triangular latch 114. A pair of symmetric elbow-shaped cutouts 115 is defined in opposite sides of the bottom surface of the lower portion 11 respectively, for engagement with the lower cover 5. Two longitudinal cutouts 121 are defined in bottom outer portions of the sidewalls 12 respectively, for engagement with the lower cover 5. Each longitudinal cutout 121 is in communication with its proximate elbow-shaped cutout 115. A longitudinal groove 122 is defined in an inner surface of each sidewall 12. The longitudinal grooves 122 are parallel and opposite to each other, for retaining the PCB 2 therein. A block tag 123 is formed on each sidewall 12 in a rear portion of the longitudinal groove 122, for fixing the PCB 2 in position. The upper portion 14 comprises a main plate 141 at a front section thereof. A plurality of conductive contacts 135 is fixed in the bracket 13, for electrically connecting with the PCB 2.

Figure 2:
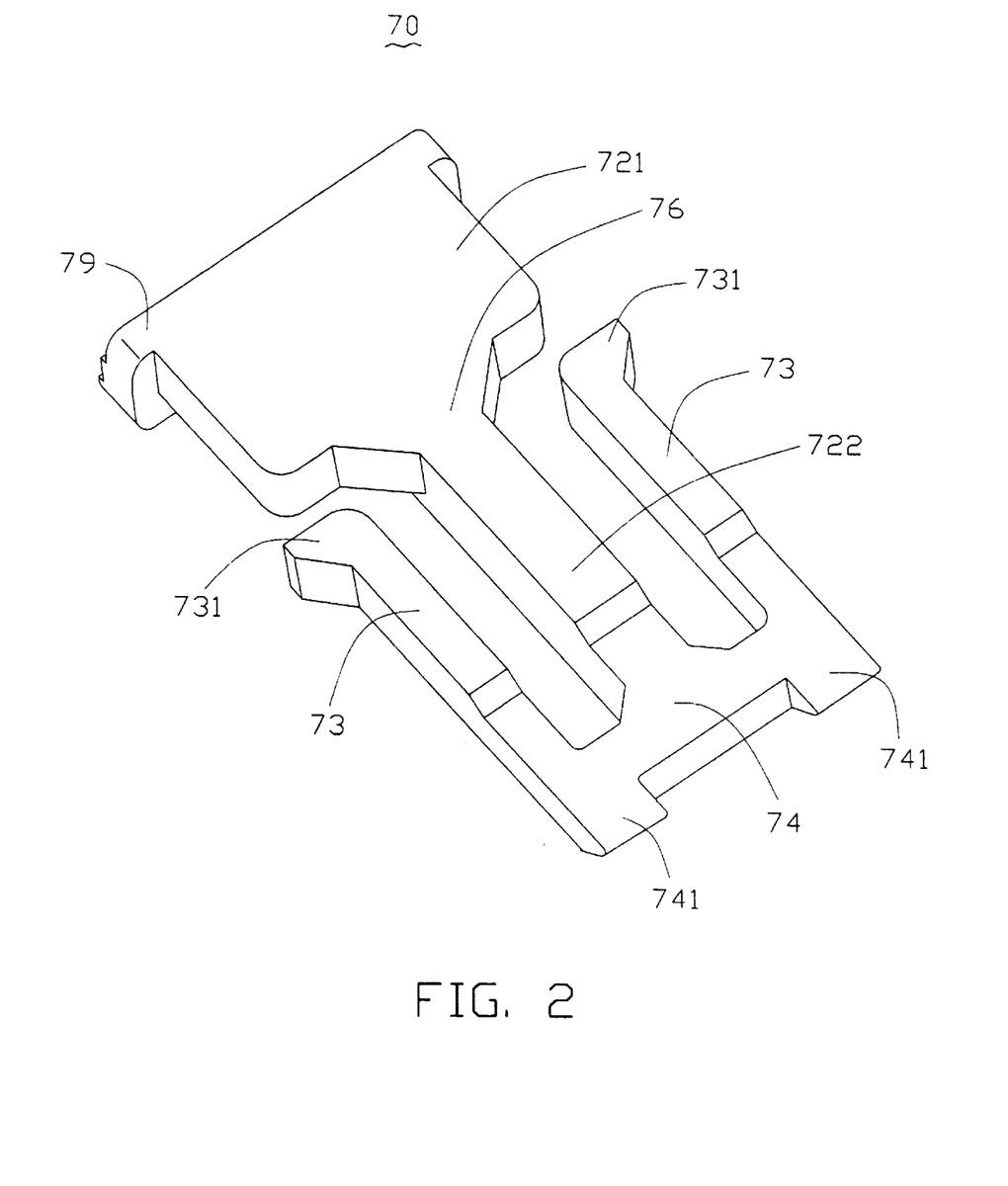
FIG. 2 is a perspective view of an ejector of the housing of the SFP module in accordance with the preferred embodiment of the present invention.

FIG. 2 is a perspective view of the ejector 70 of the housing 1. The ejector 70 comprises a push bar 79 at a front end thereof, a main body 76 having a wide front portion 721 and a narrow rear portion 722, and two resilient side wings 73 extending forwardly from a rear end of and on respective opposite sides of the narrow rear portion 722. The resilient side wings 73 are parallel to the narrow rear portion 722. A protrusion 731 extends outwardly from a free end of each resilient side wing 73. A tongue board 74 is formed in a rear portion of the ejector 70. A top surface of the tongue board 74 is lower than a top surface of the main body 76. Two slanted ejecting protrusions 741 are formed at respective opposite sides of a rear end of the tongue board 74. A longitudinal guide rib 703 (see FIG. 1B) is formed on a middle of the bottom surface of the main body 76, for slidably engaging in the guide slot 112 of the lower portion 11 of the housing 1.

Figure 3:
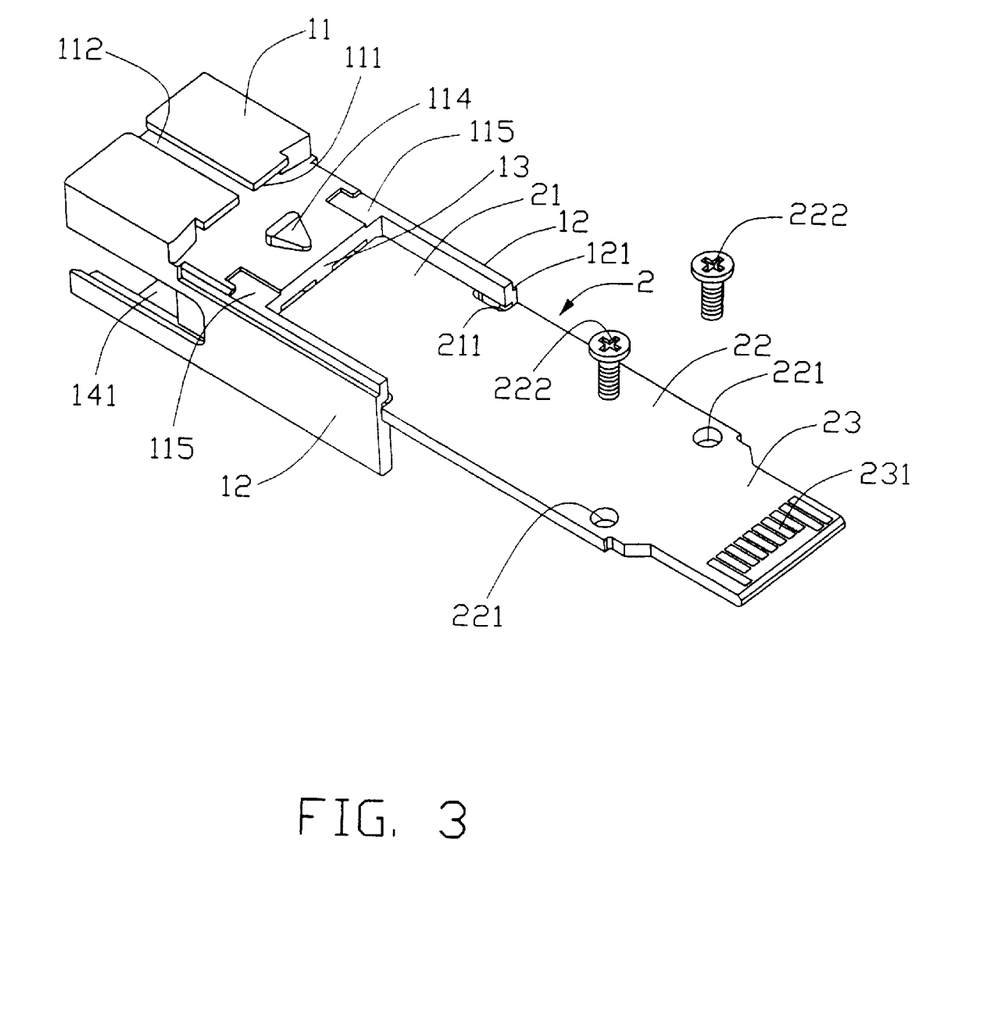
FIG. 3 is an assembled view of the part of the housing of FIG. 1 and a PCB of the SFP module in accordance with the preferred embodiment of the present invention.

Referring to FIG. 3, the PCB 2 comprises a narrow front portion 21, a wide intermediate portion 22 and a narrow rear portion 23. Two rectangular cutouts 211 are respectively defined in opposite side edges of the PCB 2, at a junction of the narrow front portion 21 and the rear portion 23. The rectangular cutouts 211 cooperate with the block tags 123 of the housing 1 to fix the PCB 2 in the housing 1. Two through holes 221 are respectively defined near opposite side edges of a rear section of the wide intermediate portion 22, for extension of screws 222 therethrough to fix the PCB 2 to the base 3. A plurality of connecting pads 231 is formed on the narrow rear portion 23.

Figure 4A:
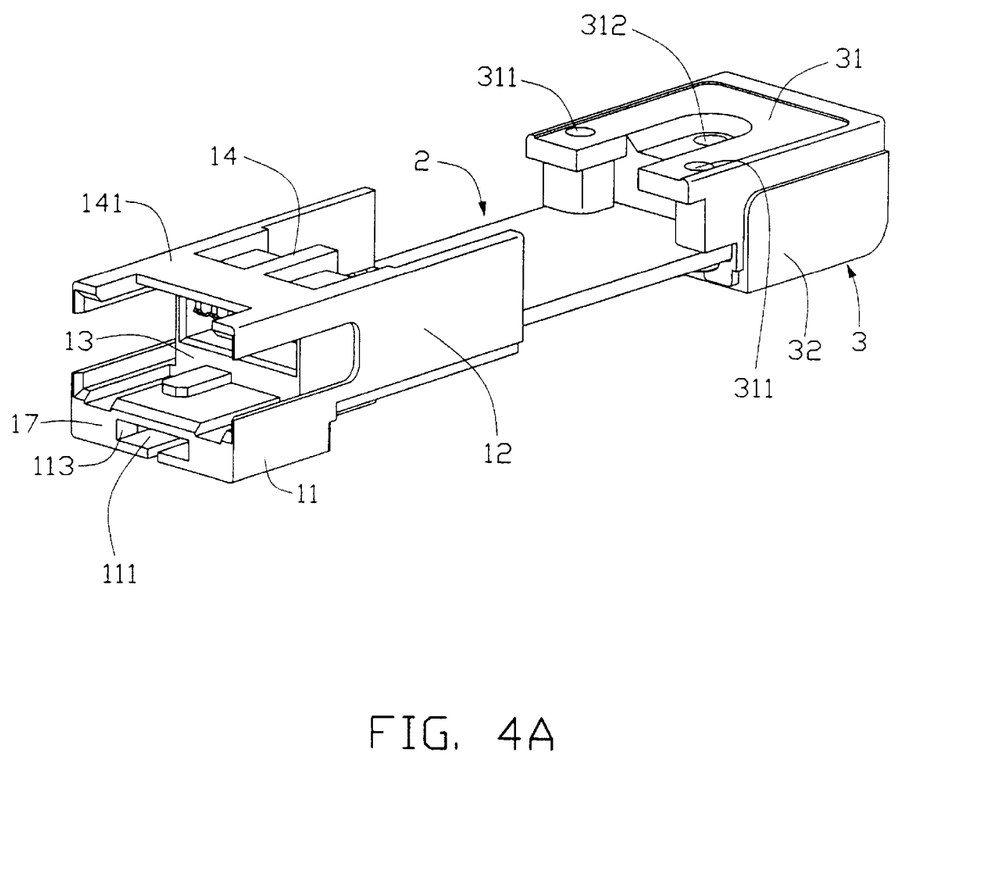
FIG. 4A is an assembled view of the part of the housing of FIG. 1, the PCB and a base of the SFP module in accordance with the preferred embodiment of the present invention.
Figure 4B:
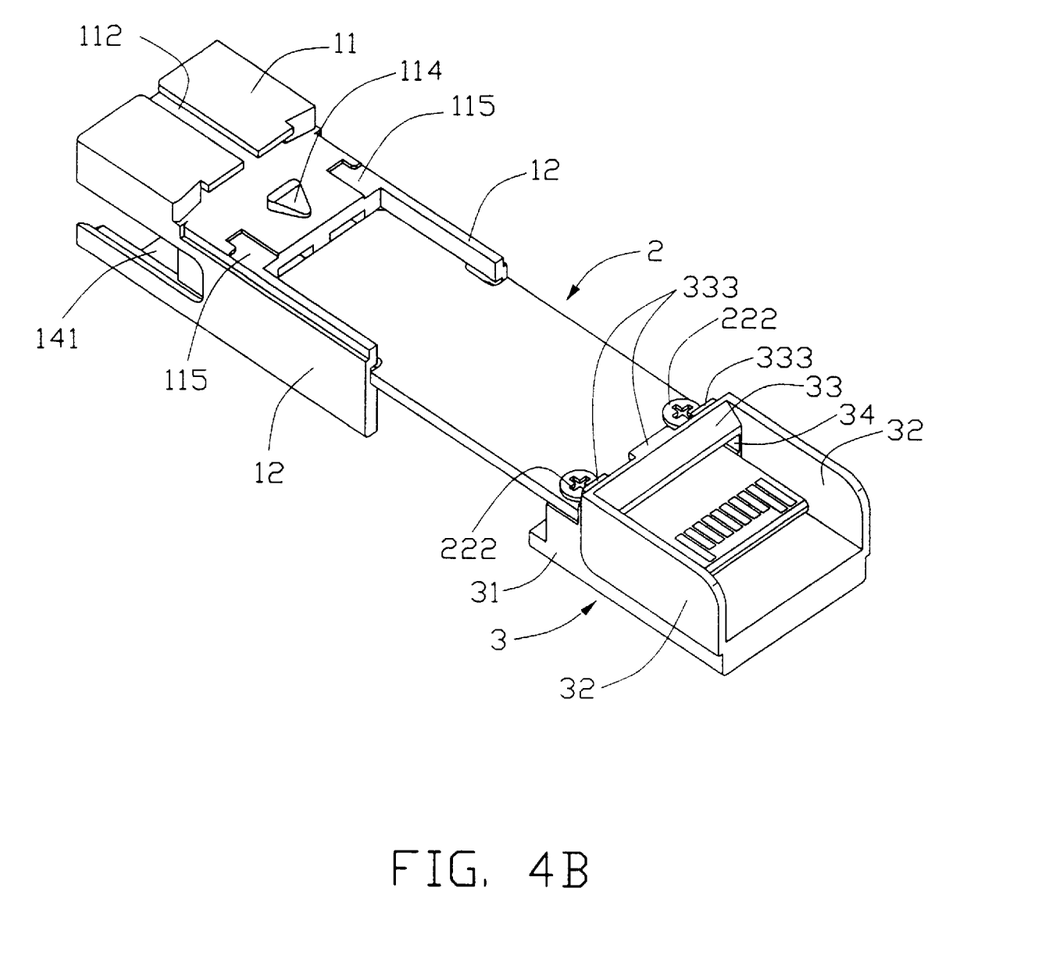
FIG. 4B is similar to FIG. 4A, but viewed from a bottom aspect.

Referring to FIGS. 4A and 4B, the base 3 comprises an upper portion 31, two parallel opposite sidewalls 32, and a front connecting wall 33 integrally connecting the sidewalls 32. Three positioning blocks 333 are each generally rectangular. The positioning blocks 333 are formed in a generally triangular formation on a middle of a front face of the front connecting wall 33, for engaging with the upper cover 4. A rectangular opening 34 is defined in the front connecting wall 33, for insertion of the PCB 2 therethrough. Two screw holes 311 are defined in a front section of the upper portion 31, for engagingly receiving the screws 222. A locating hole 312 is defined in a central recessed area of the upper portion 31, for engagingly receiving a screw (not shown).

Figure 6B:
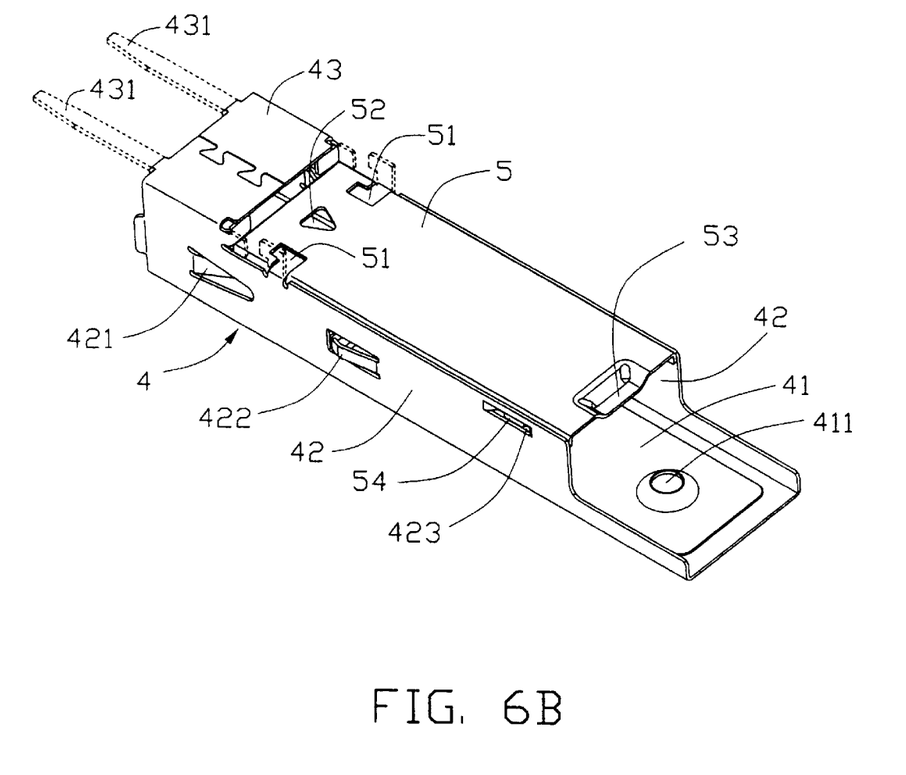
FIG. 6B is similar to FIG. 6A, but viewed from a bottom aspect.

Referring to FIGS. 5, 6A and 6B, the lower cover 5 is generally made of metal. A pair of symmetric elbow-shaped cutouts 51 is respectively defined in opposite sides of a front portion of the lower cover 5, corresponding to the elbow-shaped cutouts 115 of the housing 1. A triangular hole 52 is defined in a middle of the front portion of the lower cover 5 between the elbow-shaped cutouts 51, for receiving the triangular latch 114 of the housing 1. A recess 53 is defined in a rear portion of the lower cover 5. The recess 53 is dimensioned to engagingly receive the positioning blocks 333 of the base 3. Two positioning tabs 54 (only one visible) depend from respective opposite sides of a rear portion of the lower cover 5.

The upper cover 4 is generally made of metal. The upper cover 4 comprises an upper plate 41, two sidewalls 42 integrally depending from the upper plate 41, and a bottom plate 43 formed between front portions of the sidewalls 42. A bent tab 421 extends inwardly from a front portion of each sidewall 42. A grounding tab 422 is formed in a middle portion of each sidewall 42. A reception socket 423 is formed in a lower rear portion of each sidewall 42, for engagingly receiving the corresponding positioning tab 54 of the lower cover 5. A hole 411 is defined in a rear portion of the upper plate 41, for extension of the screw (not shown) therethrough. Two blocking tabs 431 integrally extend forwardly from a front edge of the bottom plate 43. A block 412 is inwardly stamped from a middle of a front portion of the upper plate 41. Two grounding tabs 413 are formed in a middle portion of the upper plate 41. Two elbow-shaped tabs 424 integrally depend from respective opposite bottom edges of the front portions of the sidewalls 42, for being engagingly received in the elbow-shaped cutouts 115 of the housing 1. Two rectangular tabs 425 integrally extend rearwardly from the front portions of the sidewalls 42 respectively, for fixedly retaining the housing 1.

Figure 8:
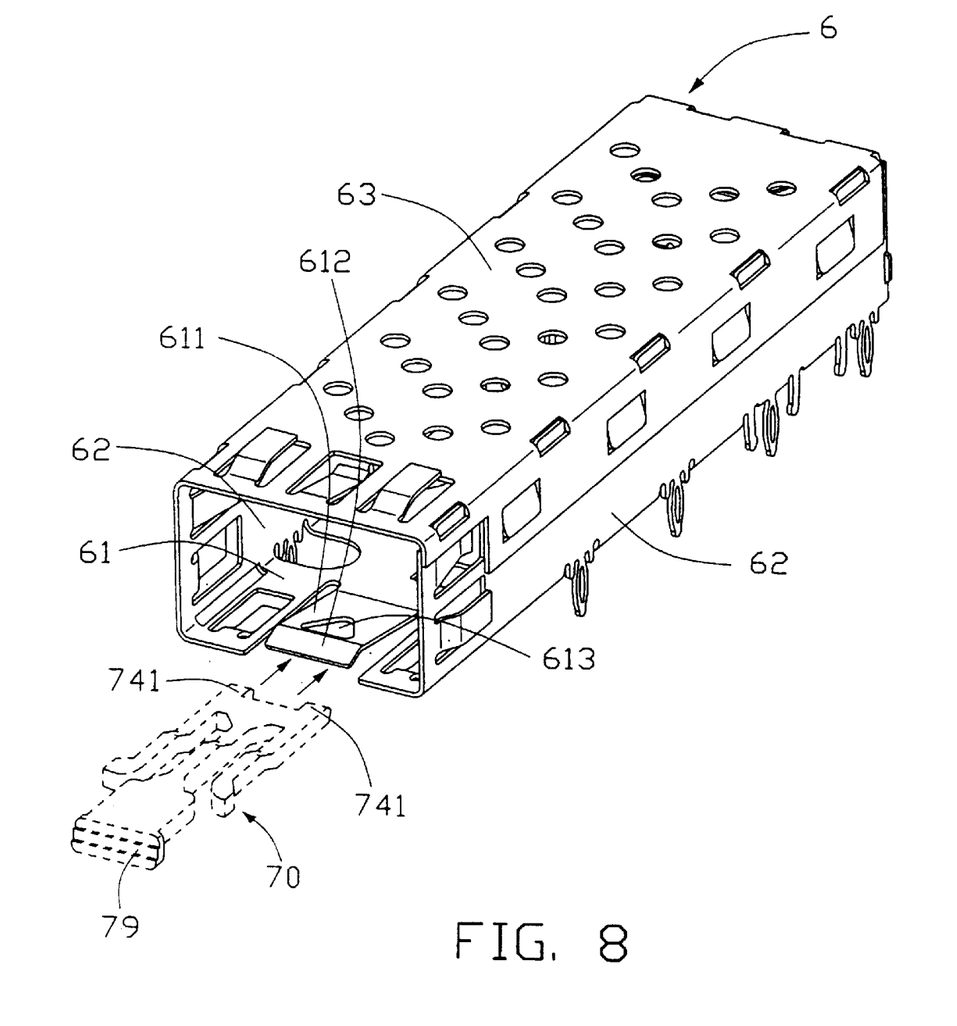
FIG. 8 is a perspective view of an SFP cage, and the ejector of FIG. 2 shown in broken lines.

FIG. 8 shows a cage 6 for retaining the SFP module of the present invention. The cage 6 comprises a bottom wall 61, two sidewalls 62 extending upwardly from the bottom wall 61, and a top wall 63 connecting between the sidewalls 62. A spring tab 611 is formed in a front portion of the bottom wall 61, and extends slightly upwardly into a middle of the cage 6. The spring tab 611 has a bent portion 612 at a front end thereof. The bent portion 612 extends slightly downwardly from a main portion of the spring tab 611, and corresponds to the ejecting protrusions 741 of the ejector 70. A triangular hole 613 is defined in the spring tab 611, for retaining the triangular latch 114 of the housing 1.

Referring to FIG. 3, in attaching the PCB 2 to the housing 1, the narrow front portion 21 of the PCB 2 is snappingly inserted into a rear of the housing 1. The opposite side edges of the PCB 2 are received in the grooves 122 of the housing 1. The blocking tags 123 of the housing 1 tightly engage in the rectangular cutouts 211 of the PCB 2. Referring to FIGS. 4A and 4B, in attaching the base 3 to the combined housing 1 and PCB 2, the narrow rear portion 23 of the PCB 2 is inserted into the opening 34 of the base 3. The narrow rear portion 23 is then fixed to the upper portion 31 of the base 3. The screws 222 are inserted through the holes 221 of the PCB 2 to threadedly engage in the screw holes 311 of the base 3.

Referring to FIG. 5, the lower cover 5 is then attached to the pre-assembled SFP module comprising part of the housing 1, the PCB 2 and the base 3. The elbow-shaped cutouts 51 of the lower cover 5 are aligned with the elbow-shaped cutouts 115 of the housing 1. The recess 53 of the upper cover 5 engagingly receives the positioning blocks 333 of the base 3. Flanges on respective opposite longitudinal sides of the lower cover 5 are fittingly engaged in the longitudinal cutouts 121 of the housing 1. The triangular latch 114 of the housing 1 extends through the triangular hole 52 of the upper cover 5.

The ejector 70 is then snapped into the ejector seat 111 of the housing 1. The ejector seat 111 and the guide slot 112 of the housing 1 cooperate to slidably receive the ejector 70. The guide slot 112 of the ejector seat 111 slidingly receives the guide rib 703 of the ejector 70. The resilient side wings 73 of the ejector 70 prevent the ejector from falling out of the ejector seat 111. A top face of the front portion of the lower cover 5 is firmly held by the ejecting protrusions 741 of the tongue board 74 of the ejector 70. The push bar 79 of the ejector 70 is exposed forward of the front end 17 of the housing 1.

Figure 7A:
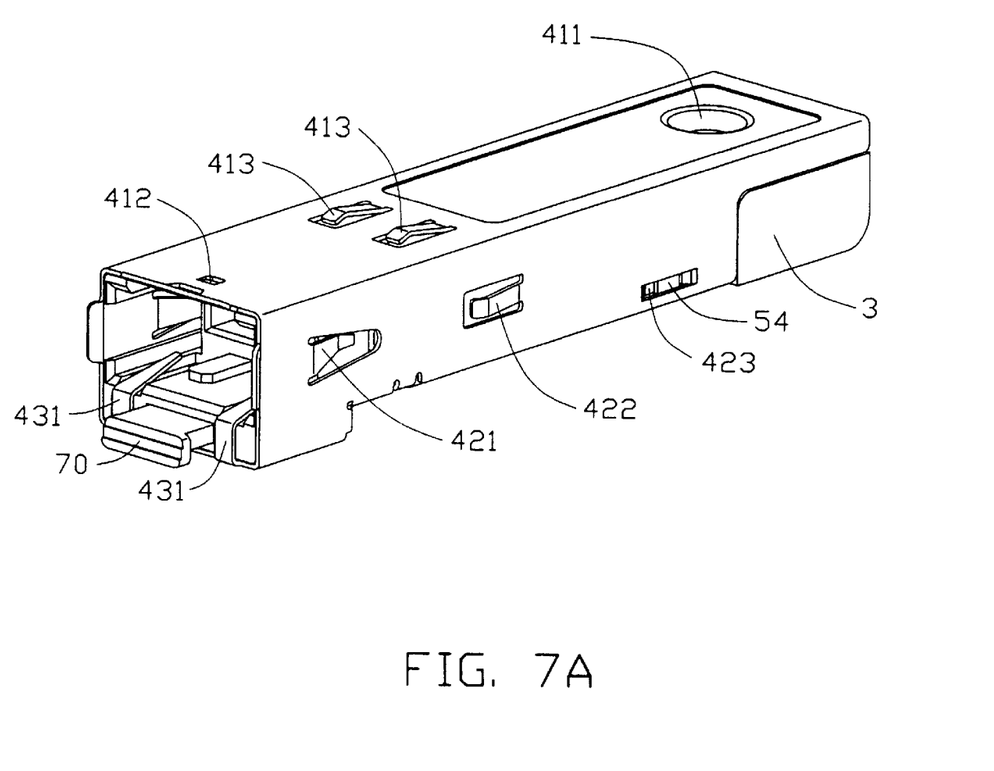
FIG. 7A is a fully assembled perspective view of the SFP module in accordance with the preferred embodiment of the present invention.
Figure 7B:
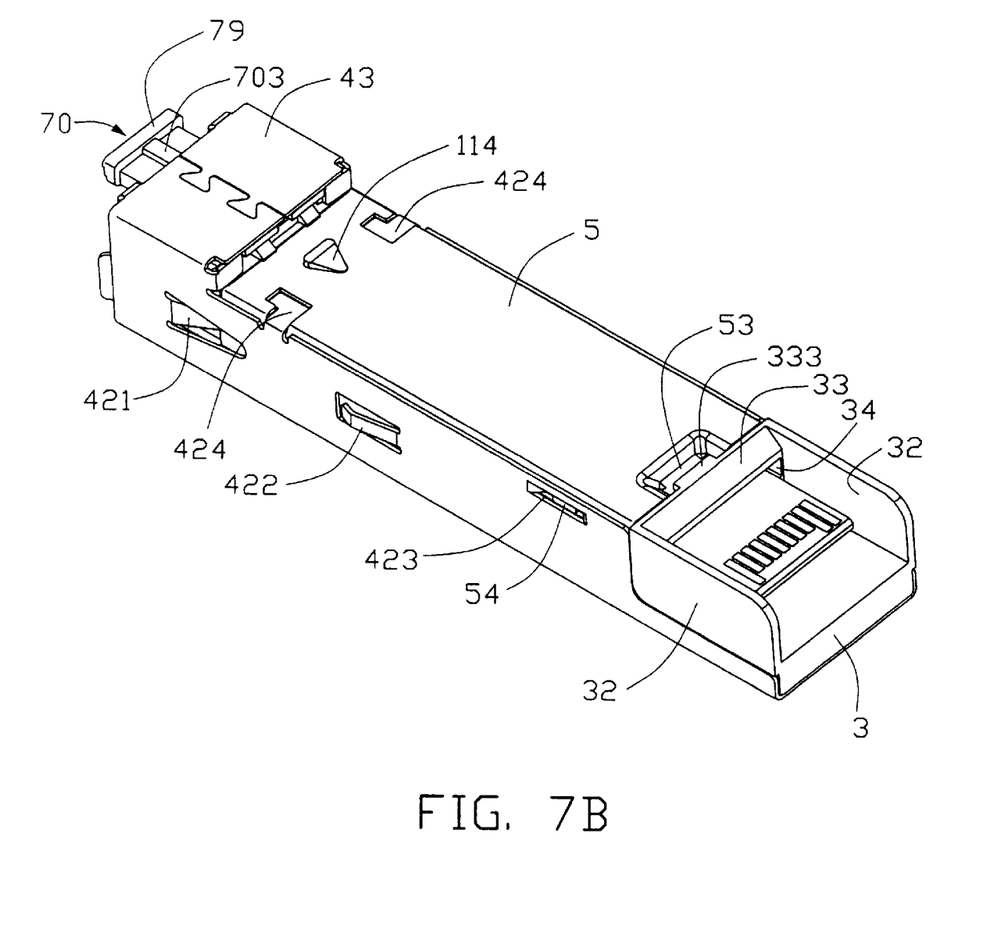
FIG. 7B is similar to FIG. 7A, but viewed from a bottom aspect.

Finally, referring to FIGS. 7A and 7B, the upper cover 4 is then attached to the combined pre-assembled SFP module and lower cover 5. The blocking tabs 431 and the block 412 of the upper cover 4 prevent over-insertion of the pre-assembled SFP module and lower cover 5 into the upper cover 4. The elbow-shaped tabs 424 of the upper cover 4 are bent inwardly and downwardly, and respectively engagingly received in the elbow-shaped cutouts 115 of the housing 1. The blocking tabs 431 of the upper cover 4 are bent backwardly and inwardly, and are respectively engaged in two parallel recesses (not labeled) defined in the lower portion 11 of the housing 1. A forward edge of the main plate 141 of the housing 1 firmly abuts against the block 412 of the upper cover 4. The screw (not shown) is extended through the hole 411 of the upper cover 4 to threadedly engage in the locating hole 312 of the base 3. The upper cover 4 is thereby firmly engaged with the base 3. The positioning tabs 54 of the lower cover 5 are received in the reception sockets 423 of the upper cover 4. The rectangular tabs 425 are bent inwardly and engaged in two opposite recesses (not labeled) defined in the lower portion 11 of the housing 1.

When the SFP module of the present invention is snappingly inserted into the cage 6, a spring force is thereby generated in the spring tab 611 of the cage 6. The spring tab 611 exerts an upward force on a bottom of the SFP module. The triangular latch 114 of the housing 1 is retained in the triangular hole 613 of the spring tab 611 of the cage 6. A space (not labeled) is thus defined between the bent portion 612 of the spring tab 611 and the bottom of the SFP module.

FIG. 8 illustrates a process when the SFP module is released and withdrawn from the cage 6. The push bar 79 of the ejector 70 is manually pushed into the ejector seat 111, such that the ejecting protrusions 741 of the ejector 70 enter the space (not labeled) between the bent portion 612 of the spring tab 611 and the bottom of the SFP module. The ejecting protrusions 741 slidingly contact the bent portion 612, and progressively force the bent portion 612 away from the SFP module. As a result, the spring tab 611 is released from the triangular latch 114 of the housing 1. The SFP module is then ejected from the cage 6 by conventional spring means (not shown) located in a rear portion of the cage 6.

In an alternative embodiment of the present invention, the triangular latch 114 is integrally formed on the lower cover 5 instead of the housing 1. This enhances durability of the triangular latch 114.

While the present invention has been described with reference to particular embodiments, the description is illustrative of the invention and is not to be construed as limiting the invention. Therefore, various modifications to the present invention can be made to the preferred embodiments by those skilled in the art without departing from the true spirit and scope of the invention as defined by the appended claims.

What is claimed is:

1. A small form-factor pluggable module comprising:
a housing comprising a plurality of conductive contacts, an ejector seat, a latch adjacent to the ejector seat, and an ejector, the ejector comprising a pushing portion and a main body, the main body being slidably received in the ejector seat of the housing, and the pushing portion being exposed forward of a front end of the housing;
a printed circuit board having a front section and a rear section, the front section being retained in the housing and electrically connecting with the conductive contacts; a base retaining the rear section of the circuit board therein; and a cover enclosing the housing, the circuit board and the base therein;
wherein the main body of the ejector comprises at least one slanted protrusion at a rear end thereof;
wherein the housing further comprises at least one block at a front portion of the ejector seat, for preventing the ejector from falling out of the ejector seat.

2. The small form-factor pluggable module as described in claim 1, wherein the housing is made of polymer.

3. The small form-factor pluggable module as described in claim 1, wherein the latch of the housing is integrated with the housing.

4. The small form-factor pluggable module as described in claim 1, wherein the main body of the ejector comprises at least one resilient wing at least one of opposite sides thereof, the at least one resilient wing being received in the ejector seat for preventing the ejector from falling out of the ejector seat.

5. The small form-factor pluggable module as described in claim 1, wherein the ejector comprises at least one guide rib, and the ejector seat comprises at least one guide slot slidingly receiving the at least one guide rib.

6. The small form-factor pluggable module as described in claim 1, wherein the latch is formed on the cover instead of on the housing.

7. A small form-factor pluggable module retained in a small form-factor pluggable cage, the cage comprising a retaining tab at a bottom thereof, the small form-factor pluggable module comprising:
a housing comprising a plurality of conductive contacts, an ejector seat, a latch retained in the retaining tab of the cage, the latch being adjacent to the ejector seat, and an ejector comprising a pushing portion and a main body, the main body being slidably received in the ejector seat of the housing, and the pushing portion being exposed forward of a front end of the housing;
a printed circuit board having a front section and a rear section, the front section being retained in the housing and electrically connecting with the conductive contacts; a base retaining the rear section of the circuit board therein; and a cover enclosing the housing, the circuit board and the base therein;
wherein the main body of the ejector comprises at least one resilient wing at least one of opposite sides thereof, the at least one resilient wing being received in the ejector seat for preventing the ejector from falling out of the ejector seat;
wherein the ejector comprises at least one guide rib, and the ejector seat comprises at least one guide slot slidingly receiving the at least one guide rib.

8. The small form-factor pluggable module as described in claim 7, wherein the housing is made of polymer.

9. The small form-factor pluggable module as described in claim 7, wherein the latch of the housing is integrated with the housing.

10. The small form-factor pluggable module as described in claim 7, wherein the main body of the ejector comprises at least one slanted protrusion at a rear end thereof.

11. The small form-factor pluggable module as described in claim 7, wherein the housing further comprises at least one block at a front portion of the ejector seat, for preventing the ejector from falling out of the ejector seat.

12. The small form-factor pluggable module as described in claim 7, wherein the latch is formed on the cover instead of on the housing.

13. A plug module assembly comprising: a module head to head mated within a cage, said module including: a housing positioned around a rear portion of said module with a plurality of contacts therein;

a cover enclosing the housing; a latch formed on a face of one of said housing and said cover, said latch being spaced from a rear face of the housing with a distance; an ejector disposed in the housing behind said latch, said ejector being slidable along a front-to-back direction of the assembly, said ejector including a push bar exposed outside of the rear face of the housing, and a release tongue board, opposite to said push bar, located adjacent to said latch; said cage including a locking spring tab at a front portion thereof, said locking spring tab lockable with the latch; wherein said ejector is moved forwardly to have the release tongue board deflect the locking spring tab outwardly for disengaging the latch from the locking spring tab so as to withdraw the module from the cage;

wherein a front edge of the cage terminates at a position where a rear portion of the housing with the associated ejector are exposed outside said cage;

wherein said latch is a projection and the locking spring tab includes an opening receivable engaging said projection.

* * * * *